J. NEWMANN.
BALL BEARING.
APPLICATION FILED APR. 19, 1917.
1,261,154.
Patented Apr. 2, 1918.
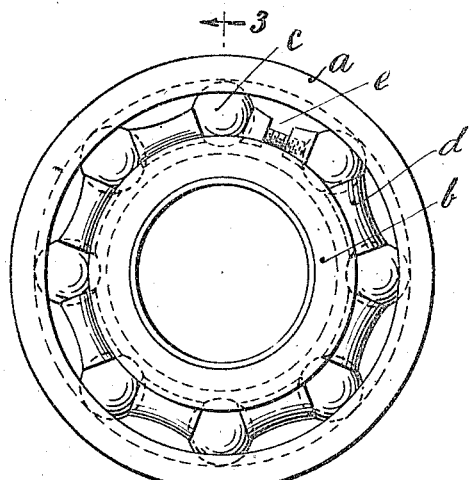
Fig. 1
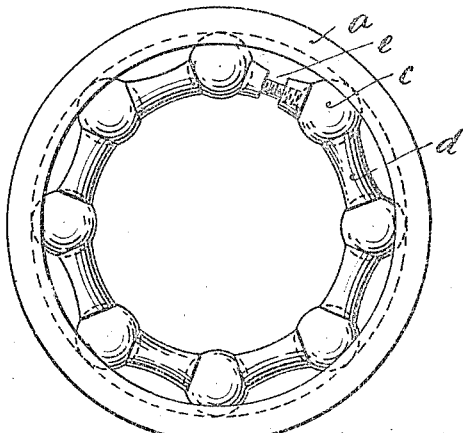
Fig. 2
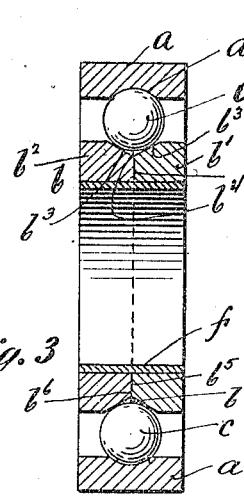
Fig. 3
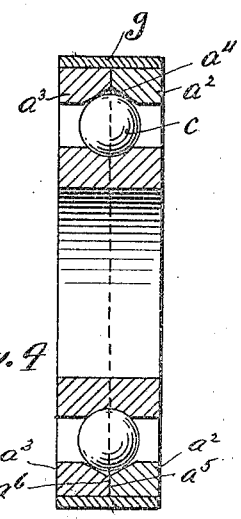
Fig. 4
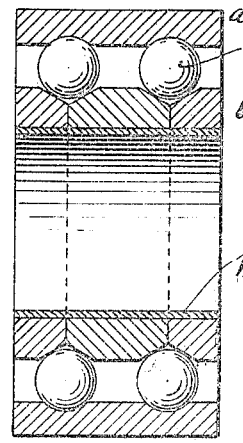
Fig. 5
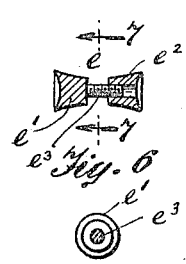
Fig. 6
Fig. 7
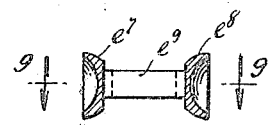
Fig. 8
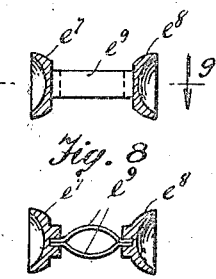
Fig. 9
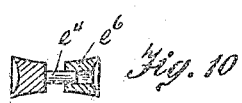
Fig. 10
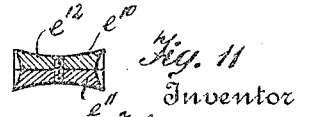
Fig. 11
Inventor
John Newman
By his Attorney

UNITED STATES PATENT OFFICE.

JOHN NEWMANN, OF NEW YORK, N. Y.

BALL-BEARING.

1,261,154.　　　　Specification of Letters Patent.　　Patented Apr. 2, 1918.

Application filed April 19, 1917.　Serial No. 163,116.

*To all whom it may concern:*

Be it known that I, JOHN NEWMANN, a citizen of the United States, residing in the city of New York, county of Kings, and State of New York, have invented certain new and useful Improvements in Ball-Bearings, of which the following is a specification.

The present invention relates to ball bearings, more particularly to such in which the balls are spaced apart from each other by separators.

Its principal object is to provide a ball bearing in which the balls and separators, once assembled between the so-called "inner cone" and the outer shell, will on the removal of said cone not fall apart, but constitute a unit. This is an important feature with ball bearings, permitting repairs or inspection without requiring the taking apart of the assembled balls and spacers or separators. There is also the advantage that the balls and separators can be assembled in the outer shell to be ready for use wherever necessary and in connection with any cone suitable for the particular location of the ball bearing.

Another object of my invention is to construct a special separator to be used as an end or last separator, which is readily adjustable or capable of extension, so that after its insertion and adjustment, the assembled balls and other separators will be locked in position.

My new end or last separator has the advantage that it can be used with double or multiple ball bearings just as conveniently and without requiring force to any great extent, as with single ball bearings, and which will permit the balls and separators to be quickly assembled and locked in position.

A further and very important object of my invention is to provide a ball bearing which in itself is adjustable, that is to say capable of enlargement and reduction with respect to the diameter of the balls to allow of the compensation for wear.

With these and other objects in view, my invention consists in the construction, combination and arrangement of parts as will be hereinafter fully described and set forth in the appended claims.

In the drawings, which form part of this specification and in which similar reference characters denote corresponding parts, Figure 1 is a side elevation of the assembled ball bearing; Fig. 2 is a side elevation of the ball bearing with the inner cone removed showing the balls and separators locked in position on the inner circumference of the outer shell and forming a unit therewith; Fig. 3 is a section on line 3—3 of Fig. 1, showing the cone made of two annular sections; Fig. 4 is a similar section on Fig. 3, showing the cone solid and the outer shell made of two annular sections; Fig. 5 is a sectional view of a double bearing with the inner cone composed of several sections; Fig. 6 is a sectional view of my end or locking separator; Fig. 7 is a section on line 7—7 of Fig. 6; Fig. 8 is a side elevation of a modified structure of an end separator; Fig. 9 is a longitudinal section on line 10—10 of Fig. 8; Fig. 10 is a section similar to that of Fig. 6 of a modified structure of an end separator; and Fig. 11 is a longitudinal section of a further modification of an end separator.

Referring to the drawing, $a$ denotes the outer shell, $b$ the inner cone, $c$ the balls, $d$ the separators and $e$ the end or last separator for locking the said balls and other separators in position. In order to make my ball bearing adjustable to compensate for wear, I make either part, the outer shell $a$ or the inner cone $b$ of two annular halves or sections and shape the circumference of the sections of the split or sectional part so that when assembled, they will form a V-shaped groove, while the solid part is provided with a spherically shaped groove.

In the structure shown in Fig. 3, the inner "cone" consists of two annular sections $b'$, $b^2$, each of which has a portion of its outer circumference made slanting, as at $b^3$, so that when the two parts $b'$, $b^2$ are assembled, they will together form on their outer circumference a V-shaped groove $b^4$. The outer shell $a$, on the other hand, in this case is provided with an annular spherically shaped groove $a'$. Owing to the sectional cone and the V-shaped groove, it will be possible to adjust the ball bearing to compensate for wear. The adjustment can be effected by grinding off the adjoining surfaces $b^5$, $b^6$ of the two sections $b'$, $b^2$, thereby raising the bearing points for the balls in the V-shaped groove, or by inserting shims (not shown) between the adjoining surfaces $b^5$, $b^6$, thereby lowering the bearing points for the balls. The two sections $b'$, $b^2$ of the inner cone may after all parts are properly assembled be joined together in any suitable manner to form a rigid single piece. In the present embodiment of my invention, this is accomplished by means of an inner bushing $f$, which may be suitably secured to both sections. In this case, the inner diameter of the sections $b'$, $b^2$ of the cone is made somewhat larger than the outer diameter of the shaft, for which the ball bearing is designed, so as to accommodate the bushing $f$, which is adapted to fit on the particular shaft. By using a thicker or thinner bushing, the inner diameter of the inner cone may be varied according to different thicknesses of shafts.

In the structure according to Fig. 4, the inner cone is shown to consist of a single annular member or ring, while the outer shell $a$ is composed of two sections or members $a^2$, $a^3$, each section having a portion of its inner circumference made slanting, as at $a^4$, so that when the two sections are assembled, they will together form a V-shaped groove $a^5$, just like the sections $b'$, $b^2$ of the cone shown in Fig. 3. These sections $a^2$, $a^3$ may be joined together in a similar manner, as the section $b'$, $b^2$, by a ring or outer bushing $g$ fitted around the outer circumference of said sections, and in which the latter may be fixed in any suitable manner. In case of wear or where larger or smaller balls are to be used in this ball bearing, the adjoining surfaces $a^6$, $a^7$ of the outer shell are ground off in order to lower the bearing points for the balls in said V-shaped groove $a^5$ or shims (not shown) may be inserted between the adjoining surfaces $a^6$, $a^7$ to raise said bearing points.

The separators $d$ are of the usual well known construction, being at their ends spherically hollowed to embrace the adjoining balls.

The separator $e$, which is used as an end or locking separator, is made adjustable or extensible so that without hammering or use of force to any great extent, the locking of the assembled parts can be effected.

According to Figs. 6 and 7, the end or locking separator consists of two head-pieces $e'$, $e^2$ in form of truncated cones, which are spherically hollowed at their ends as the heads or ends of the separators $d$. One of the members or head-pieces, as $e'$, is provided with a threaded pin $e^3$, which projects centrally therefrom and on which works the outer head-piece $e^2$ as a nut, the latter being provided with a central perforated and threaded bore. The threaded pin $e^3$ is so admeasured in length that when the parts $e'$, $e^2$ are brought close together, the free end of the pin $e^3$ will be still confined within the head-piece $e^2$ so as not to form an obstruction to the ball bearing within the spherical hollow thereof.

Instead of the structure shown in Figs. 6 and 7, the structure shown in Fig. 10 may be used. Here the projection $e^4$ is a smooth cylindrical pin, and the head-piece $e^6$ is tightly, but adjustably fitted thereon.

In Figs. 8 and 9 the end separator comprises head-pieces $e^7$, $e^8$, which are connected together by arched members $e^9$ and which are capable of being compressed or flattened, so that after the insertion of this separator, which normally is shorter than the space between two neighboring balls, the members $e^9$ are compressed or flattened, in consequence of which the head-pieces, $e^7$, $e^8$ are extended relative to another and bring about a locking of the balls and the other separators $d$ in the same manner as in the heretofore described structures.

With the structures shown in Figs. 6, 7 and 10 and advantageously also with that of Figs. 8 and 9 separate means will be required for securing the extended separator in its adjusted position. These means may consist of solder, or may be accomplished by a splint, pin or the like.

A further modification of such end separator is shown in Fig. 11. Here the separator is divided longitudinally to form two separate sections or halves $e^{10}$, $e^{11}$, which after the parts are assembled, may be joined together either by soldering or by means of a pin $e^{12}$, or the like. When using an end or last separator of this structure, its length may be the same as that of the other separators $d$, i. e., to exactly fit in the space between the neighboring balls. The sections can be inserted consecutively from the two sides of the ball bearing and thereupon joined together.

The principal advantage of my new separator is that after the balls and other separators have been assembled and locked by the last separator, they will be retained in position and form with the outer shell $a$ unit, as shown in Fig. 2, so that the inner sectional cone can be removed in case of repair or inspection without the necessity of taking the balls and separators apart. Furthermore the balls, separators and shell forming a unit, can be manufactured and held in stock to be ready for use in connection with cones of different sizes and to suit various conditions and locations of the ball bearings.

Having thus described my invention, what I claim and desire to secure by Letters Patent is:

1. In a ball bearing, the combination with a set of balls including separators between the same, of an adjustable end or last separator to serve as locking member for the assembled balls and other separators, and formed with means for securing it in adjusted position.

2. In a ball bearing, the combination with a set of balls and separators between them, of an end or last separator to serve as a locking means for the assembled balls and other separators, said end separator including a member having a threaded pin and a second member working as a nut thereon.

3. A ball bearing comprising a shell, an inner cone, a set of balls borne in said groove, a set of separators between said balls and an adjustable end or last separator serving to lock said balls and other separators in locked position and formed with means for securing it in adjusted position.

4. An adjustable ball bearing comprising a shell having an annular groove of circular cross section on its inner surface, an inner cone composed of two ring shaped sections, each having a slanting circumference to form when assembled a V-shaped groove, a set of balls borne between said shell and inner cone, a set of separators between said balls and an end or last separator capable of adjustment to lock said assembled balls and separators in position.

5. In a ball bearing, the combination with a set of balls and separators between them, of an end or last separator to serve as a locking means for the assembled balls and other separators, said end separator comprising a hollowed head piece having a centrally projecting stem and a second hollowed head piece having a socket to adjustably engage on said pin.

In testimony whereof, I affix my signature in presence of two witnesses.

JOHN NEWMANN.

Witnesses:
E. D. JUNIOR,
MAX D. ORDMAN.